April 26, 1927.
C. P. DEIBEL ET AL
1,625,848
BATTERY UNIT AND METHOD OF PRODUCING THE SAME
Filed May 3, 1926
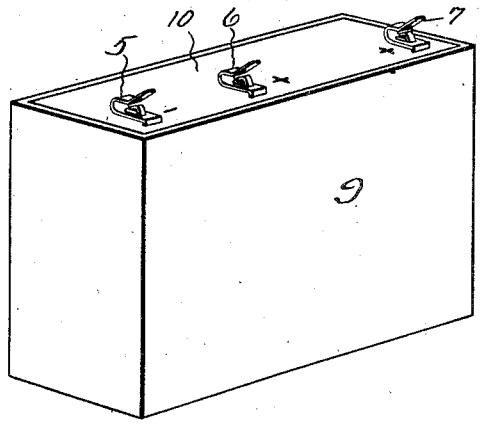
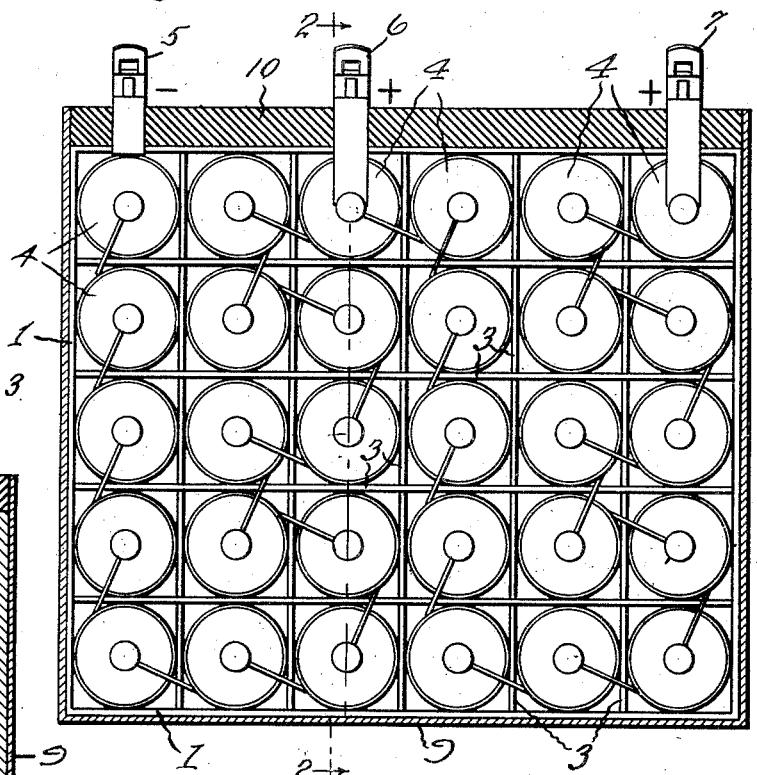
INVENTOR
C. P. Deibel
Walter L. Waitt
BY Hull Brock & West Attys.

Patented Apr. 26, 1927.

1,625,848

UNITED STATES PATENT OFFICE.

CYRIL P. DEIBEL AND WALTER G. WAITT, OF LAKEWOOD, OHIO, ASSIGNORS TO THE TWIN DRY CELL BATTERY COMPANY, OF CLEVELAND, OHIO, A CORPORATION OF OHIO.

BATTERY UNIT AND METHOD OF PRODUCING THE SAME.

Application filed May 3, 1926. Serial No. 106,251.

This invention relates to a battery unit and method of assembling the same and has particular reference to what is known in the radio battery as vertical or upright B batteries.

One of the objects of the invention is to provide a battery unit of the character described in which the several cells composing the unit are positively insulated one from the other.

Another object of the invention is to provide an improved construction of battery unit which will effect an economy in the salvage of defective batteries and which can be easily repaired and in which batteries which would otherwise be scrapped are made salable.

Further and more limited objects of our invention will appear as the description proceeds and by reference to the accompanying drawing in which Fig. 1 is a perspective view of a vertical or upright B battery; Fig. 2 is a vertical section of the same on the line 2—2 of Fig. 3; and Fig. 3 is a horizontal sectional view on the line 3—3 of Fig. 2.

According to present methods for constructing and assembling batteries it has been customary to assemble dry cells in series and seal them in a case with suitable terminals. Such batteries are well known as radio A, B and C batteries; also multiple batteries for ignition, telephone and general use. The usual dry cell batteries employ zinc cups which serve both as containers and negative elements. When cells are assembled in series it is essential that insulating material be used between adjacent cells, otherwise if two or more zinc cans touch each other the cells will be short circuited and the entire battery rendered useless.

Various methods have been employed for insulating adjacent cells. One method is to wrap the sides and bottom of each cell in paper. Another method has been to enclose each cell in a paper cylinder. Sometimes a paper cap is added to the bottom of the paper cylinder, in which case the bottom of the zinc can is insulated as well as the sides. Still another method is to use so-called egg crating which is made of cut box board which can be folded flat for shipment and storage, and which when opened up form cell-like compartments or partitions in a paper box. These are commonly used in boxes for holding small quantities of eggs and are familiar to all. A similar type of paper egg crating is used for insulators between adjacent cells in radio batteries where a number of cells are assembled to give comparatively high voltages. The egg crating provides insulating partitions between sides of adjacent dry cells, but does not cover the bottoms of the cells. The individual cells in radio batteries are connected in series by wires which are soldered at one end to the negative zinc can of one cell and at the other end to the positive terminal of the next cell and so on. If a drop of molten solder drops from the soldering iron it may fall to the bottom of the box and flatten out, and as the battery is moved about the piece of loose solder may slide under the bottoms of the egg crating and contact with two or more adjacent cells. A piece of connecting wire may also be dropped accidentally to the bottom of the box and act likewise, thereby short circuiting adjacent cells. As a 22½ volt battery contains 15 cells and a 45 volt battery contains 30 cells, a stray piece of solder or wire is most likely to get under the bottoms of some adjacent cells.

According to our invention we have provided a simple, efficient and inexpensive method of preventing the short circuiting as described in the preceding paragraph. As hereinbefore stated, the egg crating loose in the paper box holds the dry cells and provides insulating partitions between the sides of adjacent cells, but does not prevent metallic particles from dropping to the bottom of the box and sliding around under the lower edges of the egg crating and bottom of the cells as the battery is moved about or turned on its side. Our invention provides a means for fastening the lower edges of the egg crating to the bottom of the box thus sealing the bottom of each compartment. If a piece of conductive material then falls into a cell compartment it becomes trapped and cannot make contact with cells in other compartments, as the bottoms of all compartments are sealed.

The egg crating may be fastened to the bottom of the box by any practical or suitable adhesive such as paste, glue, dextrine or the like. Another method is to coat the bottom of the box with pitch or tar and then press the lower edges of the egg crating into the adhesive material, thereby sealing the bottom of each compartment. We prefer the latter method as tars and pitches are inexpensive, non-conductive and waterproof. We do not limit ourselves to so-called egg crating but include in our invention the sealing of any insulating partitions to the bottom of the battery box in order to provide cell compartments each of which is sealed at the bottom.

Radio batteries were first manufactured and used as the flat or horizontal type. As the radio art developed and cabinets were developed to enclose and conceal all batteries there came a demand for batteries which would require a minimum table space. The battery manufacturers met this demand by the development of the so-called vertical or upright battery which is simply the horizontal battery set on one of its sides and the arrangements of wiring terminals and sealing means so arranged that the terminals and seals are on the top of the battery while the individual cells in the battery are in the horizontal position.

In the manufacture of vertical batteries it is the general practice to assemble the required number of cells in a box board box with suitable insulation between the cells. The cells are connected in series and the entire mass of box, insulating strips, cells and connecting wires are then bonded into one mass by pouring a sub-seal of suitable pitch, tar or wax over and around the individual cells. On top of the mass described above there is then poured a further mass of insulating pitch or wax. This top layer of wax has a thickness of approximately ½ inch and is sometimes supported by a card board placed on top of the cells before the wax is inserted. The mass just described is then inserted into an outer box or casing, terminals are soldered to the wire leads from the assembled cells and the open top of the casing is sealed by suitable sealing material.

In our improved construction, we substitute a corrugated straw board or equivalent material for the top layer of pitch or wax in the inner box referred to in the preceding paragraph. This corrugated paper or straw board may be single ply or as many plies as are necessary to fill up the space between the top of the inner container and the side wall of the casing.

This construction is much cheaper, as in the standard 45 volt B battery a sheet of double corrugated board weighing one ounce replaces 16 ounces of sealing wax. At present market prices this is decreased in cost of about 3¾ cents per battery. Furthermore, there is a labor saving as the pieces of corrugated board can be put on the top of the sub-seal of the battery in a very small fraction of the time taken for pouring the hot wax and in addition there is no delay in waiting for the wax to cool. The extra equipment, floor space investment and gas consumed in heating the sealing material is also saved. The reduction in weight also means decreased cost in express and freight charges. This construction has a further advantage in that economy in the salvage of defective batteries is effected. It is common practice to inspect and test all batteries just before packing and shipping. In the usual construction it is extremely difficult to open up a battery for internal inspection and repair, for the reason that the sealing wax sub-seal cannot be readily removed without considerable effort and oftentimes damage to the cells. If a defective cell is found the battery is so damaged by the opening up process that it cannot be made re-salable and the battery must be scrapped. With our improved construction it is only necessary to cut off a side of the outer cardboard box or casing, lift out the layer of corrugated board and the top of each cell and all the wiring and soldered joints are accessible for inspection and repair. Repairs can be easily made on the defective cells and batteries which would otherwise be scrapped are made salable.

While the saving per battery may seem small, the fact that thousands of vertical batteries are made every day enables our improved construction to effect a saving of thousands of dollars a year.

While we prefer corrugated straw board for the purpose described we do not limit our invention to this material as sawdust, sand, wood or any suitable non-conductive material which will serve as a filler and which may be easily put into position or removed in one piece and which does not have to be melted and poured into position, is included in our invention.

*Drawings.*

In carrying out our invention we first provide a container 1 of suitable size, preferably a paste board box, and coat the bottom of the box on the inside with a layer of adhesive material 2. The partitions 3 are next inserted and pushed down until they contact with the layer of adhesive material 2. It will be clear that the partitions form a plurality of compartments which are sealed at their lower ends. The dry cells 4 are next inserted and connected in series as shown in Fig. 3 and suitable terminals 6, 7 and 8 are provided. A strip 8 of corrugated strawboard or other suitable material is then placed over the open end of the container 1 to close the same. The container 1 is then enclosed in a suitable box or casing 9 and is sealed by means of seal 10.

It will now be clear that we have provided a battery unit and process of assembling the same which will accomplish the objects of the invention as hereinbefore stated.

Having thus described our invention, what we claim is:—

1. In a battery unit, a container having a layer of plastic material on the bottom thereof, partitions dividing said container into a plurality of compartments, said partitions having one side embedded in said plastic material, a dry cell removably secured in each of said compartments, said cells being removable from said compartments without disturbing the seal of the individual compartments.

2. A battery unit of the class described comprising a container, a layer of plastic material on the bottom of said container, partitions dividing said container into a plurality of compartments, the bottoms of said partitions engaging in said plastic material whereby to form a seal for the bottom of each compartment, a dry cell removably secured in each compartment, a strip of straw board covering the top of said cells, said strip of straw board adapted to hold said cells into engagement with said plastic material and a casing enclosing said container and means for sealing said casing.

3. A battery unit of the class described comprising a container having a layer of plastic material on the bottom thereof, partitions dividing said container into a plurality of compartments, said partitions having one side embedded in said layer of plastic material, a dry cell removably secured in each of said compartments, said cells being removable from said compartments without disturbing the seal of the individual compartments, a casing enclosing said container and slightly larger than the container, a strip of insulating material extending across the top of the cells and holding said cells in engagement with said layer of plastic material, said strip being removable from said casing without disturbing the bottom seal of the individual compartments, and means closing the upper end of said casing.

In testimony whereof, we hereunto affix our signatures.

CYRIL P. DEIBEL.
WALTER G. WAITT.